United States Patent [19]
Akutagawa et al.

[11] Patent Number: 6,140,407
[45] Date of Patent: Oct. 31, 2000

[54] PNEUMATIC TIRE PROVIDED WITH ELECTRICALLY CONDUCTIVE COATING

[75] Inventors: Keizo Akutagawa; Yasuhiro Naito; Ken Yamaguchi, all of Kodaira, Japan

[73] Assignee: Bridgestone Corporation, Tokyo, Japan

[21] Appl. No.: 09/212,275

[22] Filed: Dec. 16, 1998

[30] Foreign Application Priority Data

Dec. 16, 1997 [JP] Japan ................................. 9-346520
Dec. 9, 1998 [JP] Japan ................................. 10-350276

[51] Int. Cl.[7] .............................. C08K 3/04; B60B 11/00
[52] U.S. Cl. ........................................ 524/496; 152/209.1
[58] Field of Search ..................... 524/496; 152/209 R

[56] References Cited

U.S. PATENT DOCUMENTS 4,857,397  8/1989  Mowdood et al. ..................... 524/496
5,872,178  2/1999  Kansupada et al. ..................... 524/496

FOREIGN PATENT DOCUMENTS 0 705 722  4/1996  European Pat. Off. .

Primary Examiner—James J. Seidleck
Assistant Examiner—Olga Asinovsky
Attorney, Agent, or Firm—Sughrue, Mion, Zinn, Macpeak & Seas, PLLC

[57] ABSTRACT

This invention relates to a pneumatic tire coated with a water-based electrically conductive coating, in which the coating contains a carbon black having a nitrogen adsorption specific surface area ($N_2SA$) of 70 $m^2/g$–180 $m^2/g$ and a dibutyl phtalate (DBP) absorption of 70 ml/100 g–180 ml/100 g, a surface active agent and a rubber ingredient.

7 Claims, 1 Drawing Sheet

PNEUMATIC TIRE PROVIDED WITH ELECTRICALLY CONDUCTIVE COATING

BACKGROUND OF THE INVENTION

1. Field of the Invention

This invention relates to a pneumatic tire provided with a water-based electrically conductive coating.

2. Description of Related Art

Since a tread rubber containing silica as a filler is high in the specific resistance, for example, $10^{10}$–$10^{12}$ Ω·m, a pneumatic tire provided with the tread is difficult to dissipate a static electricity generated in a vehicle body to a ground through the tread.

In order to solve the above problem, there is proposed a tire provided with a tread coated with an organic solvent-based electrically conductive coating on a surface thereof.

Such a tire is easily manufactured, but adversely influencing a working atmosphere owing to using the organic solvent.

Further, EP A 0705722 discloses a tire having a tread coated with a water-based coating. A carbon black contained in the coating has a large surface area and a high electric conductivity, but high cost; and the coating containing the carbon black is low in the adhesion property to the surface of the tread.

SUMMARY OF THE INVENTION

It is, therefore, an object of the invention to provide a pneumatic tire provided with a water-based electrically conductive coating which has a high adhesion property to a tread surface as well as a good working atmosphere and a low cost.

In order to attain the object mentioned above, a pneumatic tire according to the invention has the following constructions:

The pneumatic tire according to the invention is characterized in that the pneumatic tire comprising a tread made of a rubber composition having a high electrical resistance, a member adjacent to the tread and made of a rubber composition having a low electrical resistance (for example, $10^5$–$10^6$ Ω) and a water-based electrically conductive coating extended from an outer surface of the tread to an outer surface of the member, in which the water-based electrically conductive coating comprises a rubber ingredient, carbon black and a surface active agent, the carbon black having a nitrogen adsorption specific surface area ($N_2SA$) of 70 $m^2/g$–180 $m^2/g$ and a dibutyl phtalate (DBP) absorption of 70 ml/100 g–180 ml/100 g. The $N_2SA$ and DBP absorption of the carbon black are measured in accordance with ASTM D3037-93 and ASTM D2414-97, respectively, and the classification is shown in ASTM D1765-98.

The rubber ingredient is preferably at least one rubber selected from the group consisting of styrene-butadiene copolymer rubber (SBR), natural rubber (NR), and butadiene rubber(BR); and preferably added as a rubber latex. The carbon black is preferably at least one selected from the group consisting of N100S, N200S, N300S, and N600S in accordance with the ASTM classification. Further, the carbon black is preferably an amount of 30–70 parts by weight based on 100 parts by weight of the rubber ingredient. Further, the surface active agent is preferably nonionic. The surface active agent is preferably of an amount of 1–15 parts by weight based on 100 parts by weight of the rubber ingredient. The rubber composition for the tread contains silica.

BRIEF DESCRIPTION OF THE DRAWINGS

The invention will be described with reference to the accompanying drawings, wherein.

DESCRIPTION OF THE PREFERRED EMBODIMENTS

Figure 1:
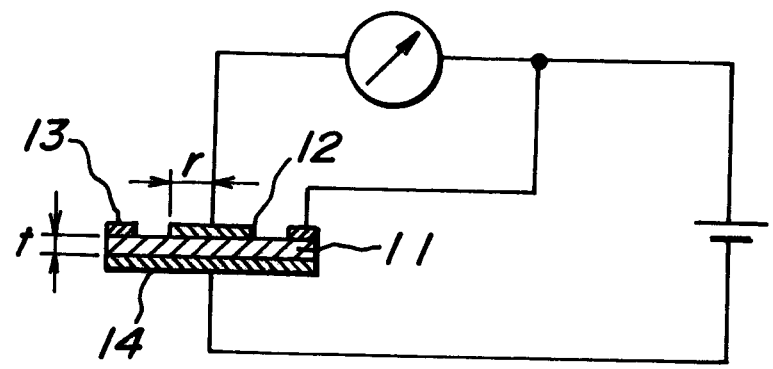
FIG. 1 is a schematic view showing measurement of an electrical resistance R of each of disc-shaped samples in the examples.

The invention will be explained in more detail below. Among colloidal properties of the carbon black to be used for the coating in accordance with the invention, the nitrogen adsorption specific surface area ($N_2SA$) is defined to be 70 $m^2/g$–180 $m^2/g$. When it is less than 70 $m^2/g$, a grain size of the carbon black is too large and an electrically conducting path is difficult to be formed. When it exceeds 180 $m^2/g$, the electrical conduction property of the coating is high, but its cost is high, and the adhesion property of the coating to the tread outer surface and the like is degraded, resulting in a low durability of the coating. Further, among the other colloidal properties of the carbon black, the DBP absorption is defined to be 70 ml/100 g–180 ml/100 g. When it is less than 70 ml/100 g, a structure of an aggregate of the carbon black grain dose not almost developed, therefore, not only the electrically conducting path is formed, but also the coating itself according to the invention lowers in the reinforcing property. When it exceeds 180 ml/100 g, it is outside of a range of the colloidal properties of the carbon black used for the tire and its cost is high.

The carbon black to be preferably used in the invention is, concretely, N100S, N200S, N300S, and N600S in accordance with the ASTM classification.

Further, a compounding ratio of the carbon black to the rubber ingredient is preferable to be 30–70 parts by weight, more preferably 40–60 parts by weight, and most preferably 45–55 parts by weight to 100 parts by weight. Because when it is too small, the electrical conduction property is not sufficient. When it is too large, not only the peeling of the coating from the tread rubber and the like readily generates, but also the electrical conduction property is not much improved.

The water-based electrically conductive coating according to the invention contains a surface active agent in order to ensure a wettability between the electrically conductive coating and the surfaces of the tread or the members adjacent to the tread. That is, since the surfaces of the rubber compositions are hydrophobic, if a water-based coating without containing a surface active agent is applied thereonto, the coating forms spots on the surfaces of the rubbers, resulting in that it is almost impossible to form an uniform coating. Then, in order to form the uniform coating, an affinity to the surfaces of the rubbers is enhanced by adding a surface active agent to the water-based coating. A preferable amount of the surface active agent added is 1–15 parts by weight based on 100 parts by weight of the rubber ingredient. When it is less than 2 parts by weight, the coating may not be able to ensure the affinity (wettability) to the surface of the rubber members, while when it exceeds 30 parts by weight, the adhesion property after vulcanization tends to lower.

The surface active agent according to the invention is preferable to be nonionic, and particularly its HLB (hydrophile-lipophile balance) is preferable to be 3–15.

When an anionic or a cationic surface active agent is used, the aging of the coating tends to be accelerated.

As such a surface active agent, mention may concretely be made of alkyl phenol types, sorbitan ester types, sorbitan esterether types, polycarbonate types, perfluoro alkyl types, acetylene diol types, polyoxyethylene alkyl ether types or the like.

Further, the rubber ingredient of the water-based electrically conductive coating according to the invention is preferable to be at least one rubber selected from the group consisting of SBR, NR, and BR in view of co-vulcanization property of the coating to the rubber members such as the tread and the member adjacent to the tread. More preferably, the rubber ingredient is added as a rubber latex.

Further, the pneumatic tire according to the invention is effective when the rubber composition constructing the tread contains silica. Irrespective of the construction of the tread such as the tread made of one kind of rubber composition, the tread having a cap-base structure or the like, the invention can be applied and the effect of the invention is obtained.

In the invention, the amount of the carbon black contained in the coating and an amount of the coating applied are properly designed in accordance with a kind of the carbon black contained in the coating, a tire size, a specific resistance of the tread rubber itself, a method of coating or the like. In order to effectively dissipate the static electricity generated in the vehicle body, an electrical resistance of the tire as a product is preferable to finally be not more than $10^8$ $\Omega$.

The water-based electrically conductive coating according to the invention may have proper additives as conventionally used added to it.

The coating according to the invention may be prepared by admixing a colloidal solution of the carbon black, the rubber latex, the surface active agent and the like according to a conventional method.

The pneumatic tire according to the invention may be manufactured by coating the thus obtained coating over the surface of the tread and at least a part of the surface of the rubber member adjacent to the tread to ensure a discharging path, and vulcanizing it by a conventional method.

Since the coating according to the invention remains both on a convex region and a concave region of the tread having a groove after vulcanization, the discharge path can be ensured not only in a new tire but also in a tire after the coating on the convex region is worn. This occurs by contact between the coating on the concave region and the ground.

The invention will be explained on the basis of Examples and Comparative Examples below.

By applying each of coatings having various recipes shown in Table 3 onto the surface of the tread rubber having a recipe shown in Table 1 and a side wall rubber having a recipe shown in Table 2, a pneumatic tire having a size of 196/65R15 is manufactured. The electrical resistance, a durability, and a peeling property between the side wall rubber and the tread rubber are examined in a new tire and in a tire after 20,000 km running.

Rubber ingredients are used as rubber latices. The SBR latex has a rubber concentration of 40% by weight, the NR latex has a rubber concentration of 60% by weight and the BR latex has a rubber concentration of 57% by weight.

The tire is manufactured by applying the coating onto the outer surface of the tread and at least a part of the outer surface of the side wall rubber adjacent thereto before vulcanization (a thickness of the coating is 0.1–1.0 mm), and vulcanizing it according to the conventional process.

Further, a wettability of the coating to the tread rubber, a specific resistance of the coating, and a peeling strength are measured by applying each of the coatings having the various recipes to rubber sheets having the above recipe for the tread and having the recipe for the side wall rubber, or the like.

Wettability

The rubber sheet having the recipe shown in Table 1 is made, and coated with each of the coatings having various recipes shown in Table 3, and then dried while the state of the coating is observed by a naked eye from the beginning of coating to drying of the coating.

Evaluation standard o: This mark shows a good wettability from the beginning of coating to drying of the coating.

Δ: This mark shows that the coating wets the tread only at the beginning of coating but is repelled as drying.

×: This mark shows that the coating is repelled from the beginning of coating.

Specific resistance of coating

A disc shaped sample having a radius (r) of 2.5 cm and a thickness (t) of 0.2 cm for measuring the specific resistance of each of the coatings is formed by drying the coating and then being vulcanized through sulfur (in which sulfur is contained in two parts by weight based on 100 parts by weight of rubber ingredient). The sample is placed in an insulation resistance test box made by a Advantest Co., Ltd. as shown in FIG. 1 and then measured about its electrical resistance (R). Then, a specific resistance (ρ) thereof is calculated according to the following equation.

$$\rho = (\pi r^2 / t)R$$

In FIG. 1, numeral 11 is the sample, numeral 12 a main electrode, numeral 13 a guard electrode, and numeral 14 a counter electrode.

Electrical resistance of tire

Figure 2:
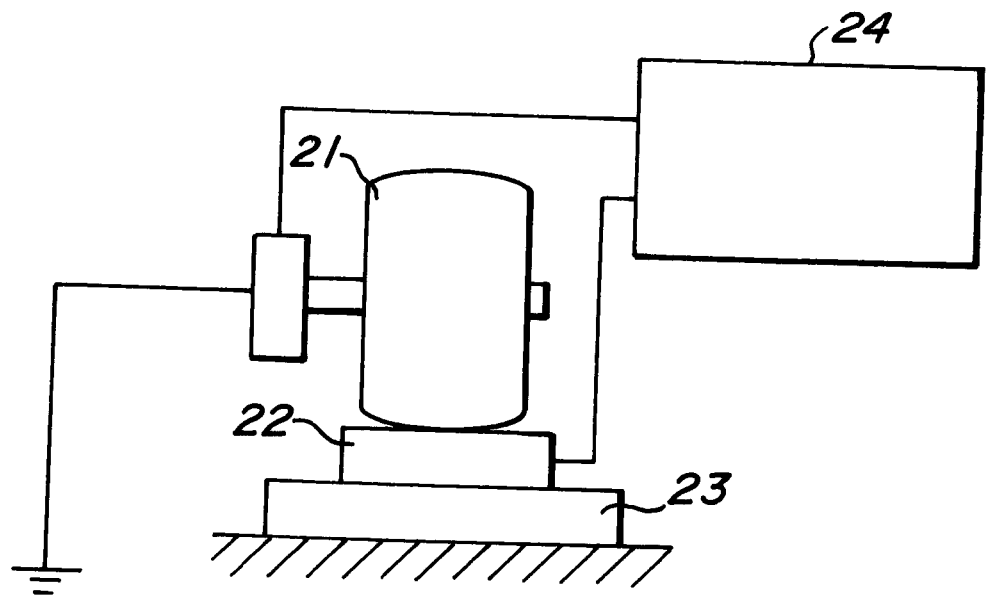
FIG. 2 is a schematic view showing measurement of an electrical resistance of each of tires in the example.

An electrical resistance of each of a new tire and a tire after 20,000 km running is measured according to Wdk 110 Sheet 3 of German Association of Rubber Industry by placing an assembly 21 of a test tire and a rim on a steel plate 22 placed on an insulation plate 23. An electrical current of 100 V between the rim and the steel plate to read as electrical resistance by means of a high resistance meter of Model HP4339A made by Hewlett Packard as shown in FIG. 2.

Peeling strength

The tread rubber sheet having the recipe shown in Table 1 and the side wall rubber sheet having the recipe shown in Table 2, respectively having a thickness of 2 mm before vulcanization are prepared. Then one surface of the tread rubber sheet is coated with an organic solvent-based cement (so called a under cement) to be used for bonding tire rubber members, on the other hand, one surface of the side wall-rubber sheet is coated with an organic solvent-based coating in Comparative Example 1 (see: *1), or with the water-based electrically conductive coating in each of Comparative Examples 2–4 and Examples 1–9. Then, two rubber sheets are united with the both coated surfaces opposite to each other, and vulcanized. The vulcanized and united sheets are cut out to a size of 10 mm×150 mm, the tread rubber sheet and the side wall rubber sheet are then respectively pulled in the opposite directions to measure a force necessary to peel at a speed of 100 mm per minute. The larger numerical value, the better adhesion property.

Durability

According to FMVSS (federal motor vehicle safety standard) -No. 109, a total running time before breakage of the tire is measured by repeating running on the drum while a load applied to the tire is changed stepwise. Durability is represented by an index value on the basis that Comparative Example 1 is 100. The larger the index value, the longer the running time and the better the durability.

Peeling property between side rubber and tread rubber

Each tire after the above drum test is observed at the joining portion between the side wall rubber and the tread rubber by a naked eye.

Evaluation standard

×: This mark shows that peeling is detected irrespective of a degree of the peeling.
○: This mark shows that no peeling is detected, namely, the case other than the above.

TABLE 1

| Tread rubber composition | (unit: parts by weight) |
|---|---|
| Styrene-butadiene rubber*1 | 70 |
| Butadiene rubber*2 | 30 |
| ZnO | 3 |
| Stearic acid | 2 |
| Silica*3 | 85 |
| Aromatic oil | 46 |
| Antioxidant*4 | 1.0 |
| Vulcanization accelerator*5 | 1.2 |

TABLE 1-continued

| Tread rubber composition | (unit: parts by weight) |
|---|---|
| Sulfur | 1.5 |
| Silane coupling agent*6 | 8.5 |

Note)
*1 SBR #1500, trademark, manufactured by JSR Co.
*2 BR01, trademark, manufactured by JSR Co.
*3 Nipsil AQ, trademark, manufactured by NIPPON SILICA INDUSTRIAL Co. Ltd.
*4 N-(1,3-dimethyl butyl)-N'-phenyl-p-phenylenediamine Santoflex 6PPD, trademark, manufactured by Flexsys Co., Ltd.
*5 N-t-butyl-2-benzothiazolyl-sulfenamide SANTOCURE TBBS, trademark, manufactured by Flexsys Co., Ltd.
*6 Si 69, trademark, manufactured by Degussa AG Co., Ltd.

TABLE 2

| Side wall rubber composition | (unit: parts by weight) |
|---|---|
| Natural rubber | 40 |
| Butadiene rubber*2 | 60 |
| ZnO | 3 |
| Carbon black (N399) | 45 |
| Aromatic oil | 10 |
| Antioxidant*4 | 1.0 |
| Vulcanization accelerator*5 | 0.8 |
| Sulfur | 1.0 |
| Stearic acid | 2.0 |

*2, *4 and *5 are the same as in Table 1.

TABLE 3

| | | | Comparative Example | | | | Example | | | |
|---|---|---|---|---|---|---|---|---|---|---|
| | | | 1*13 | 2 | 3 | 4 | 1 | 2 | 3 | 4 |
| Coating (part by weight) | Carbon black | Colloidal graphite*7 | 50 | | | | | | | |
| | | Aquablack*8 | | 50 | | | | | | |
| | | N339*9 | | | 50 | 50 | 50 | 40 | 60 | |
| | | N234*10 | | | | | | | | 50 |
| | Rubber ingredient | SBR | | 100 | 100 | 100 | 100 | 100 | 100 | 100 |
| | | NR | | | | | | | | |
| | | BR | | | | | | | | |
| | Surface active agent | A*11 | | 3 | 3 | 0 | 3 | 3 | 3 | 3 |
| | | B*12 | | | | | | | | |
| Solvent in Coating | | | petrol#2 | water | water | water | water | water | water | water |
| Wettability | | | ○ | Δ | Δ | × | ○ | ○ | ○ | ○ |
| Specific resistance of coating (Ω·cm) | | | 1 × 10$^4$ | 5 × 10$^3$ | 5 × 10$^3$ | | 2 × 10$^3$ | 2 × 10$^3$ | 2 × 10$^3$ | 2 × 10$^3$ |
| Electrical resistance of tire (Ω) | new tire | | 1.0 × 10$^6$ | 7.0 × 10$^6$ | 5.0 × 10$^6$ | | 1.0 × 10$^6$ | 1.0 × 10$^6$ | 1.0 × 10$^6$ | 1.0 × 10$^6$ |
| | after 20,000 km running | | 2.0 × 10$^7$ | 5.0 × 10$^8$ | 2.0 × 10$^8$ | | 2.0 × 10$^7$ | 2.5 × 10$^7$ | 2.5 × 10$^7$ | 1.0 × 10$^8$ |
| Peeling strength (MPa) | | | 2.35 | 0.18 | 0.32 | — | 2.30 | 2.01 | 2.08 | 1.76 |
| Durability (index) | | | 100 | 68 | 64 | — | 96 | 93 | 94 | 82 |
| Peeling property between side wall rubber and tread rubber | | | ○ | × | × | — | ○ | ○ | ○ | ○ |

| | | | Example | | | | |
|---|---|---|---|---|---|---|---|
| | | | 5 | 6 | 7 | 8 | 9 |
| Coating (part by weight) | Carbon black | Colloidal graphite*7 | | | | | |
| | | Aquablack*8 | | | | | |
| | | N339*9 | 50 | 50 | 50 | 50 | 50 |
| | | N234*10 | | | | | |
| | Rubber ingredient | SBR | | | 70 | 100 | 100 |
| | | NR | 100 | | 30 | | |
| | | BR | | 100 | | | |
| | Surface active agent | A*11 | 3 | 3 | 3 | | |
| | | B*12 | | | | 1 | 3 |
| Solvent in Coating | | | water | water | water | water | water |
| Wettability | | | ○ | ○ | ○ | ○ | ○ |
| Specific resistance of coating (Ω·cm) | | | 2 × 10$^3$ | 2 × 10$^3$ | 2 × 10$^3$ | 2 × 10$^3$ | 2 × 10$^3$ |

TABLE 3-continued

| | | | | | | |
|---|---|---|---|---|---|---|
| Electrical | new tire | $1.0 \times 10^6$ | $1.0 \times 10^6$ | $1.0 \times 10^6$ | $1.0 \times 10^6$ | $1.0 \times 10^6$ |
| resistance of tire ($\Omega$) | after 20,000 km running | $4.0 \times 10^7$ | $4.0 \times 10^7$ | $4.0 \times 10^7$ | $2.0 \times 10^7$ | $2.0 \times 10^7$ |
| Peeling strength (MPa) | | 1.96 | 1.76 | 2.35 | 2.35 | 1.96 |
| Durability (index) | | 92 | 90 | 103 | 105 | 99 |
| Peeling property between side wall rubber and tread rubber | | ○ | ○ | ○ | ○ | ○ |

*[7] $N_2SA$ 50 $m^2/g$, DBP absorption 80 ml/100 g
*[8] $N_2SA$ 217 $m^2/g$, DBP absorption 200 ml/100 g Aquablack is a trademark, manufactured by Borden Inc.
*[9] $N_2SA$ 96 $m^2/g$, DBP absorption 120 ml/100 g
*[10] $N_2SA$ 126 $m^2/g$, DBP absorption 125 ml/100 g
*[11] nonionic surface active agent, HLB 12.9, NS210, trademark, manufactured by NOF CORPORATION
*[12] nonionic surface active agent, HLB 4-7, Surphinol SE-F, trademark, manufactured by Air Products Co., Ltd.
*[13] Rubber composition which contains 65 parts by weight of carbon black (N134) instead of 85 parts by weight of silica in Table 1, is dissolved in a petrol #2(as classified in Japanese Industrial Standard K2201) at a rate of 13% by weight to prepare this coating.

Besides, since the coating in Comparative Example 4 has a low wettability, a corresponding tire was not manufactured.

As explained above, according to the invention, the pneumatic tire having the excellent dissipate effect and the high durability can be obtained without using a specific electrically conductive agent such as graphite, the electrically conductive carbon black or the like, and with no influence on the adhesion property between the tread rubber and the side wall rubber.

Further, according to the invention, there are advantages such as a good working atmosphere and a low cost.

What is claimed is:

1. A pneumatic tire comprising; a tread made of a rubber composition having a high electrical resistance, a member adjacent to the tread and made of a rubber composition having a low electrical resistance, and a water-based electrically conductive coating extended from an outer surface of the tread to an outer surface of the member, said water-based electrically conductive coating comprises a rubber ingredient, carbon black and a surface active agent, the carbon black having a nitrogen absorption specific surface area ($N_2SA$) of 70 $m^2/g$–180 $m^2/g$ and a dibutyl phthalate (DBP) absorption of 70 ml/100 g–180 ml/100 g and being at least one selected from the group consisting of N100S, N200S, N300S and N600S in accordance with the ASTM classification.

2. A pneumatic tire according to claim 1, wherein the rubber ingredient is at least one rubber selected from the group consisting of styrene-butadiene copolymer rubber, natural rubber, and butadiene rubber.

3. A pneumatic tire according to claim 1, wherein the rubber ingredient is added as a rubber latex.

4. A pneumatic tire according to claim 1, wherein the carbon black is of an amount of 30–70 parts by weight based on 100 parts by weight of the rubber ingredient.

5. A pneumatic tire according to claim 1, wherein the surface active agent is nonionic.

6. A pneumatic tire according to claim 1, wherein the surface active agent is of an amount of 1–15 parts by weight based on 100 parts by weight of the rubber ingredient.

7. A pneumatic tire according to claim 1, wherein the rubber composition constructing the tread contains silica.

* * * * *